INVENTOR
RONALD ZUSSMAN
BY Philip Schneider
Lon B. Cigglebaum
ATTORNEYS $Y_1 = y_2 + (X_1X_2\cdots X_m) + \overline{(X_1+X_2+\cdots+X_m)}$ $Y_2 = y_1\cdot(X_1+X_2+\cdots+X_m)\cdot(y_2+X_1X_2\cdots X_m)$ $Z = y_{10}\cdot\overline{(X_1+X_2+\cdots+X_m)}$ INVENTOR.
RONALD ZUSSMAN
BY Philip Schneider
Lou B. Applebaum
ATTORNEYS INVENTOR
RONALD ZUSSMAN
BY Philip Schneider
[illegible]
ATTORNEYS INVENTOR
RONALD ZUSSMAN
BY Philip Schneider
Lon H. Applebaum
ATTORNEYS INVENTOR.
RONALD ZUSSMAN
BY Philip Schneider
Leon B. Goyzleton [signature]
ATTORNEYS INVENTOR
RONALD ZUSSMAN
BY Philip Schneider
Louis B. Applebaum
ATTORNEYS

Sept. 22, 1970 R. ZUSSMAN 3,530,384
PLURAL-INPUT DROPOUT AND NOISE DETECTION CIRCUIT
FOR MAGNETIC RECORDING TAPE
Filed July 29, 1968 12 Sheets-Sheet 7

INVENTOR.
RONALD ZUSSMAN
BY Philip Schneider
Lawrence B. Goodwin
ATTORNEYS

INVENTOR.
RONALD ZUSSMAN
BY Philip Schneider
Leon D. Apzglinn
ATTORNEYS

INVENTOR.
RONALD ZUSSMAN
BY Philip Schneider
Leon B. Applebaum
ATTORNEYS

INVENTOR
RONALD ZUSSMAN
BY Philip Schneider
Leon B. Coggeshall
ATTORNEYS

INVENTOR.
RONALD ZUSSMAN
BY Philip Schneider
Lon B. Appleton
ATTORNEYS

Sept. 22, 1970 R. ZUSSMAN 3,530,384

PLURAL-INPUT DROPOUT AND NOISE DETECTION CIRCUIT FOR MAGNETIC RECORDING TAPE

Filed July 29, 1968 12 Sheets-Sheet 12

INVENTOR.
RONALD ZUSSMAN
BY Philip Schneider
Lorn B. Applebaum
ATTORNEY

United States Patent Office 3,530,384
Patented Sept. 22, 1970

3,530,384

PLURAL-INPUT DROPOUT AND NOISE DETECTION CIRCUIT FOR MAGNETIC RECORDING TAPE

Ronald Zussman, Brooklyn, N.Y., assignor to the United States of America as represented by the Secretary of the Navy Filed July 29, 1968, Ser. No. 748,447
Int. Cl. H03k *19/00, 19/36;* G06f *11/00*
U.S. Cl. 328—92 8 Claims

ABSTRACT OF THE DISCLOSURE

A minimal, hazard-free, logic circuit for testing the merit of magnetic tape with respect to dropout and noise errors, the circuit being the implementation of the following input-output logical design equations:

$$Y_1=y_2+(X_1X_2\ldots X_n)+(\overline{X_1+X_2+\ldots+X_n})$$
$$Y_2=y_1\cdot(X_1+X_2+\ldots+X_n)\cdot(y_2+X_1X_2\ldots X_n)$$
$$Z=y_{1D}\cdot(\overline{X_1+X_2+\ldots+X_n})$$

The plural inputs, $X_1$ to $X_n$, each being a series of spaced pulses from a different track on a magnetic tape, are fed in parallel to an input AND gate and an input OR gate. The output of the AND gate is fed to a memory circuit comprising an OR gate in series with an AND gate, the output signal of the memory AND gate being fed back to one input of the memory OR gate. A third input signal to the memory OR gate is the inverted output of the input OR gate, this inverted output signal also being one of the input signals of the output AND gate which provides the Z output signal of the circuit. The direct output of the input OR gate is fed to one of the inputs of the memory AND gate. The output of the memory OR gate is also delayed, inverted and fed as an input to the output AND gate. The preferred embodiment also employs a safety OR gate which receives the output signals of the input AND gate and the memory AND gate and feeds its output signal to the memory AND gate. The output Z signal indicates the presence of error conditions (dropout and noise) on the magnetic tape.

The invention described herein may be manufactured and used by or for the Government of the United States of America for governmental purposes without the payment of any royalties thereon or therefor.

This invention relates to a circuit for determining the merit of magnetic recording tape and especially to a minimal logic circuit for testing magnetic tape with respect to conditions which result in the errors of dropout and noise.

Millions of dollars are spent each year in the purchase of magnetic recording tape for digital machines such as computers. Although all manufacturers certify their tapes to be dropout-free, industry standards of merit vary widely. Certification entails actual dropout testing of each reel of tape on some type of tape transport machine (this may be called testing on a digital transport). The machine may or may not be a computer system or the type of transport with which the tape is to be used. Testing on a digital computer system is unsatisfactory because it wastes valuable computer time. Testing on machines other than the type with which the tape is to be used may not provide reliable results.

Although manufacturers agree to replace defective rolls of certified tape, the high cost of computer time for on-line testing is prohibitive. Ordinary users discard faulty tape or increase system redundancy in an effort to increase the efficiency of on-line computer operations.

Thus, independent dropout and noise (error conditions) detection circuitry is desirable to enable users to pre-test digital tapes off-line without expanding valuable computer time. This testing allows users to purchase tapes by competitive bid rather than purchasing the expensive tape sold by each manufacturer for use with its own computers.

Presently available commercial tape testers are constructed with registers and separate circuitry for each channel, or track. Thus, the hardware required for checking a large number of tracks is expensive and complicated.

An object of this invention is to provide inexpensive, compact, simple and reliable circuitry to test magnetic recording tape with respect to dropout and noise error conditions.

A further object is to provide a dropout and noise detection circuit which is highly insensitive to skew.

Yet another object is to provide a tape-testing circuit which can test all tracks on a tape including those used to record parity and sprocket (timing) channel information in an actual computer.

The objects and advantages of the invention are accomplished by designing a minimal, hazard-free, circuit which receives as inputs and provides as outputs the factors involved in equations determined through the use of logical design procedures. The circuit provides an output when one or more, but not all, of a set of input signals have simultaneously existed. The output signal occurs even though skew exists between the input signals and occurs immediately after the disappearance of all input signals. Since an output signal appears only when one or more input signals of a set have been absent, the circuit indicates the presence of an error, i.e., either a dropout or noise signals.

Other objects and advantages will appear from the following description of an example of the invention, and the novel features will be particularly pointed out in the appended claims.

Figure 1:
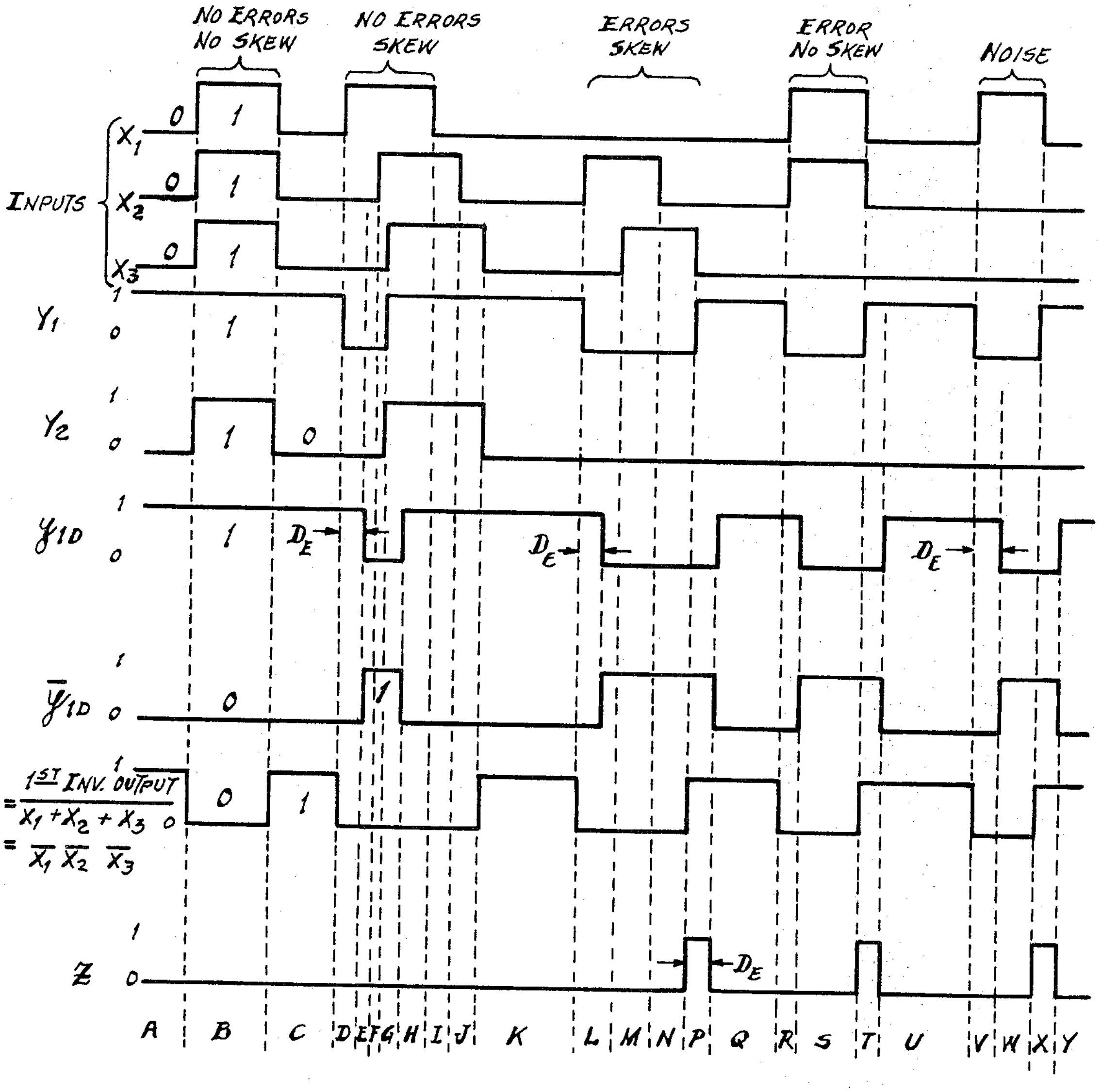
FIG. 1 is a diagram illustrating the time relations between the circuit waveforms which exist for the possible input conditions.
Figure 2:
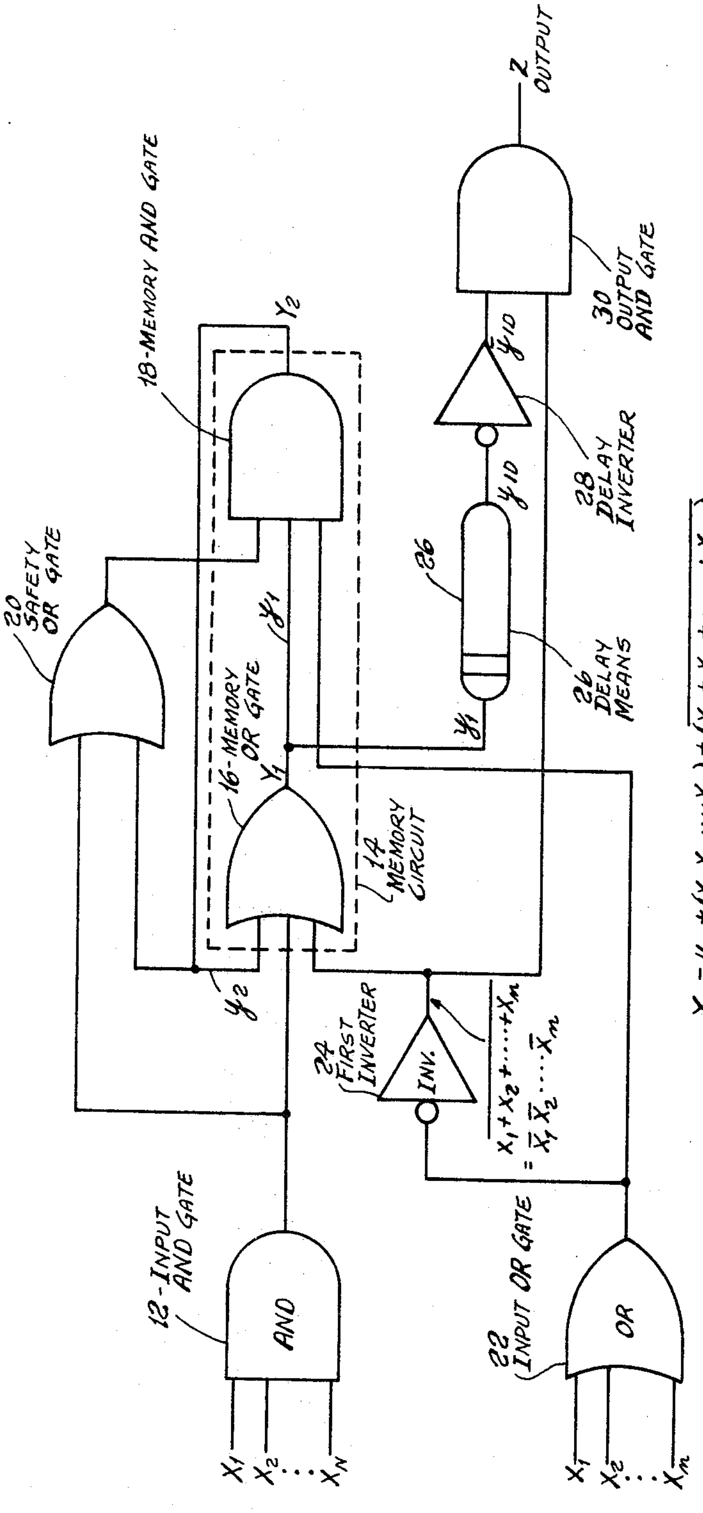
FIG. 2 is a schematic showing an embodiment of the circuit which utilizes AND gates, OR gates and inverters.
Figure 4:
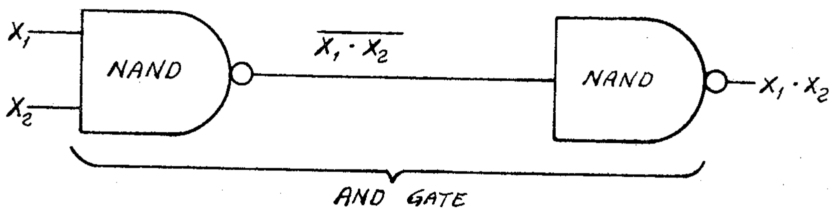
Figure 5:
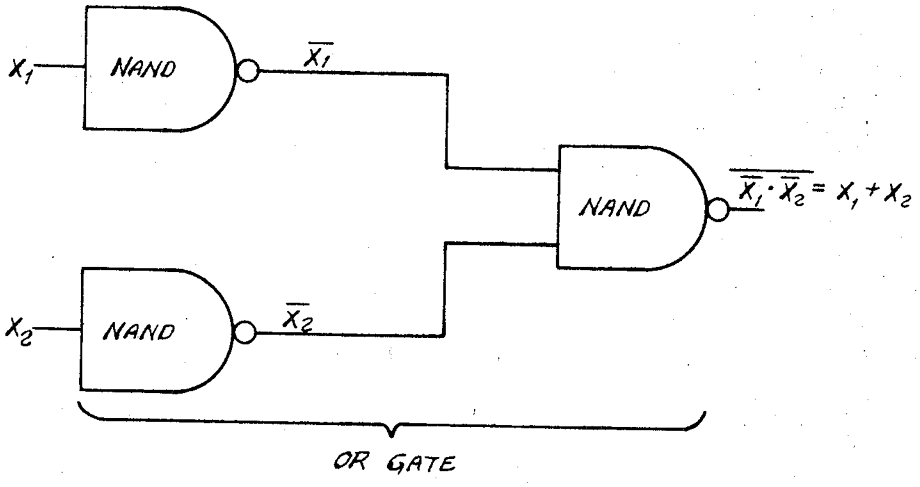
Figure 6:
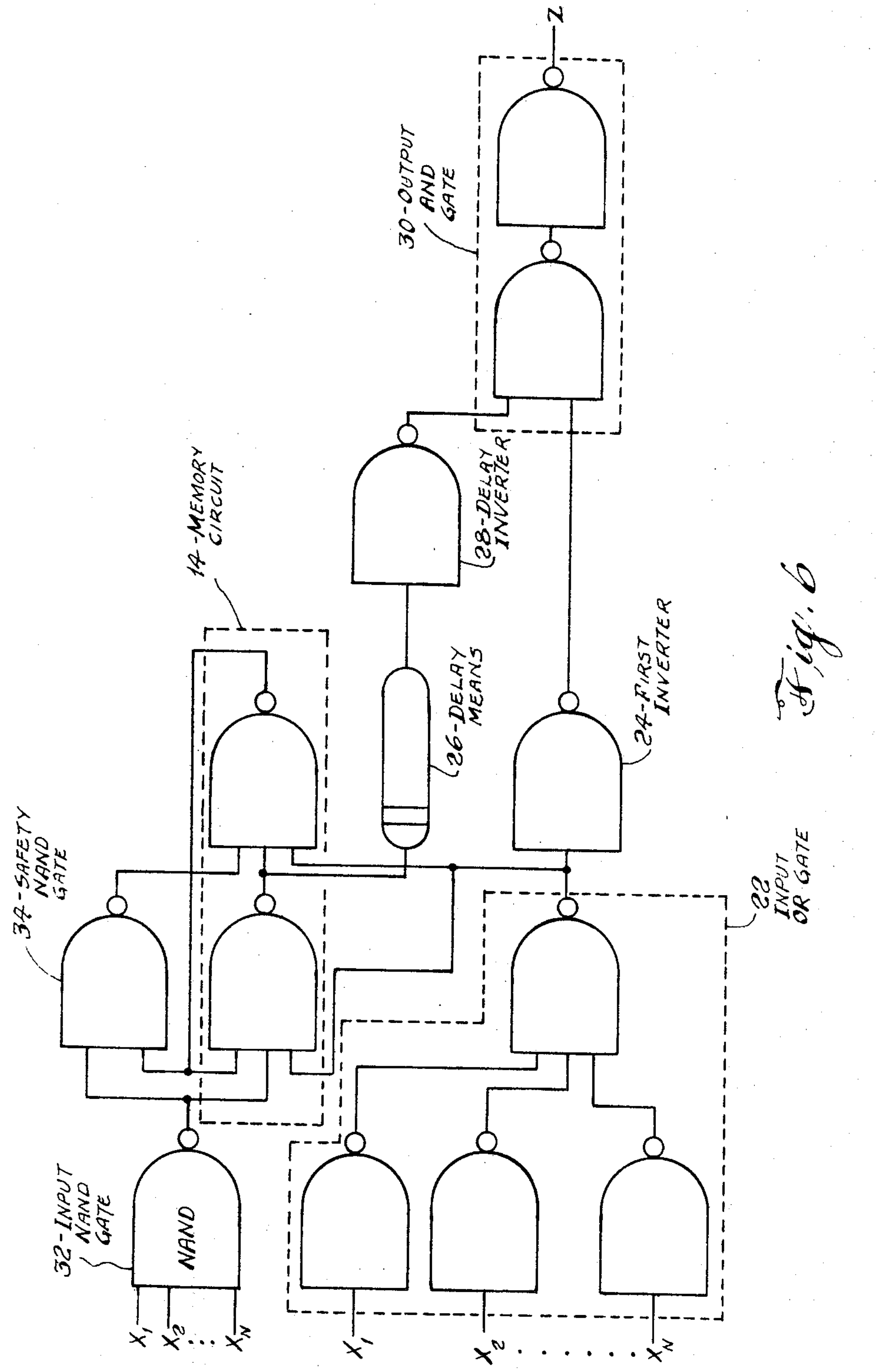
Figure 7:
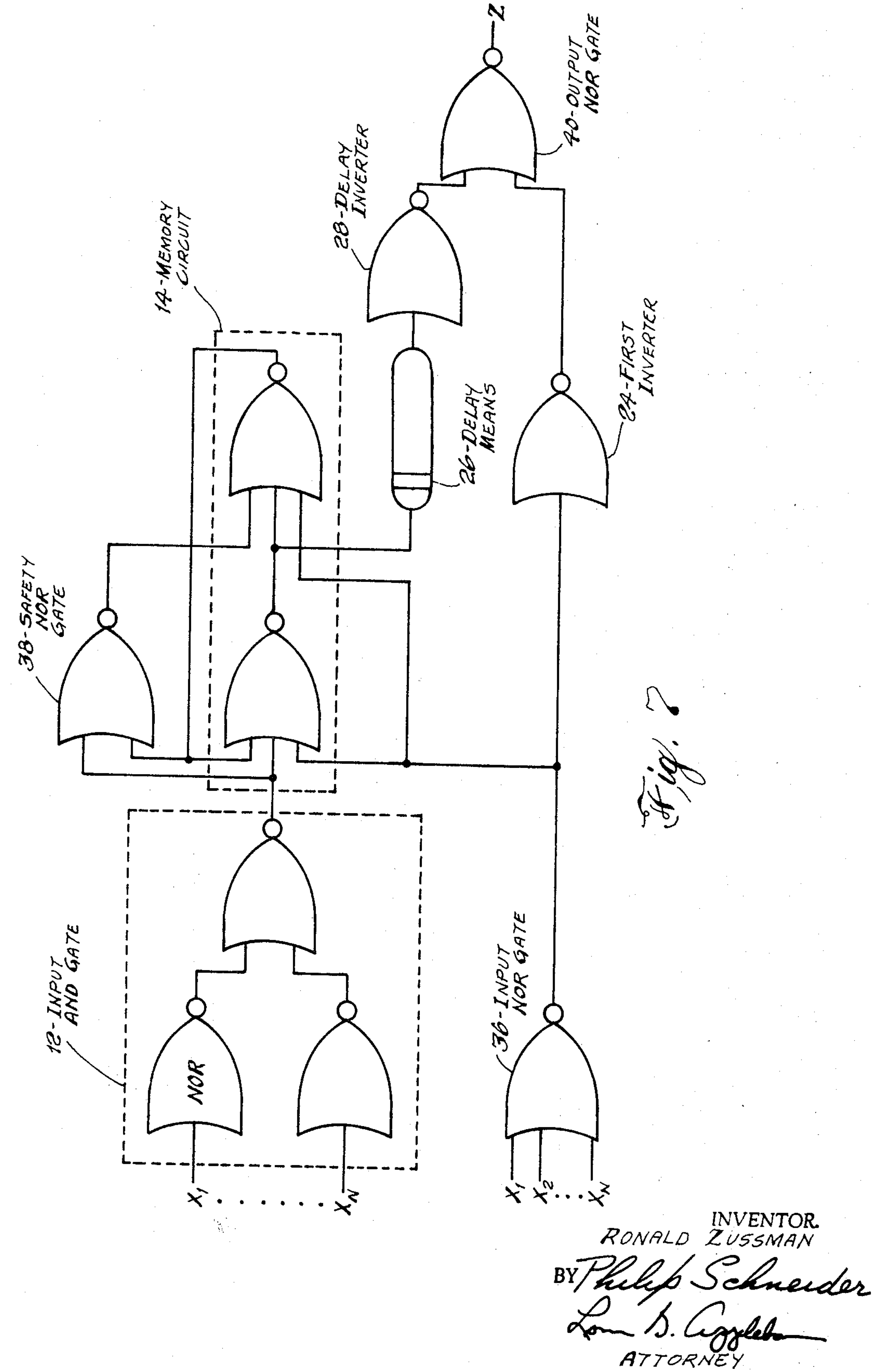

FIGS 3A–G are schematics showing the signal conditions which exist in the circuit of FIG. 2 for the various input signal combinations shown in the time intervals marked off on FIG 1;

FIGS. 4 and 5 are schematics showing how an AND gate and an OR gate can be constructed using only NAND gates;

FIG. 6 is a schematic showing an embodiment of the circuit using only NAND gates, which is equivalent to the error-measuring circuit of FIG. 2; and FIG. 7 is a schematic showing an embodiment of the circuit using only NOR gates, which is equivalent to the error-measuring circuit of FIG. 2.

An understanding of the operation of the circuit can be approached from the standpoint of the relations between the waveforms existing at different points in the circuit. These waveforms are shown in FIG. 2 for a 3-input circuit. Actually, the circuit operates for any number of inputs (the set $X_1, X_2, \ldots X_n$) from a minimum of two to the limit *n* imposed by the fan-in capabilities of the individual input logic gates which are employed. (However, it should be noted that if more inputs are to be processed, additional input gates with the same limited fan-in capabilities can be combined to handle the increased fan-in requirements.)

The input signals are a series of pulses which are simultaneously recorded on each track of a magnetic tape which is to be tested. The frequency of the pulses is not critical and may vary from a very low frequency to the highest that can be passed cleanly by the logic circuits which are employed. A group of pulses recorded simultaneously on all tracks of a tape is called a character, or set. Thus, the inputs to the dropout and noise detection circuit are a series of characters, or sets of pulses, and the time relations between the pulses in each set may vary because of skew. The number of pulses in each set may vary because of dropout and spurious sets may be present because of noise. Noise and dropout both constitute errors which should generate output signals.

The principles of operation of the circuit are the following:

(1) No output signal exists when all input signals are absent (all inputs = 0) and (a) no input signals were present before (e.g., the starting condition shown in interval A), or (b) all input signals existed simultaneously at some time during the occurrence of a set which existed immediately prior to the occurrence of the "all inputs = 0" condition (e.g. intervals C and K). Note that this is true even when the input signals are offset from each other in time, i.e. are skewed.

(2) No output signal is generated when all input signals exist simultaneously (all inputs = 1). This condition exists during intervals B, G, and H.

(3) No output is generated when one or more input signals are present (e.g., intervals D, E, F, G, H, I, J, L, M, N, R, S, V and W).

(4) An output signal is generated when the last existing input signal disappears (goes to 0) after a set of input signals has occurred in which one or more, but not all, input signals have been present (have been equal to 1) simultaneously (e.g., intervals P, T and X).

Thus, the memory circuit stores the fact that input signals have been present simultaneously at all inputs and uses it to inhibit the production of an output signal.

Once the above conditions and principles of operation of the circuit have been decided upon, logical design principles are applied and certain equations defining the operation of the circuit are evolved. These equations are shown in FIG. 2. The X symbols are for the various input signals; the Y symbol designates an internal output signal from one of the circuit components; the *y* symbol signifies the same signal as the Y symbol with which it shares a common subscript when the Y signal is employed as an input signal to one of the circuit components; the D subscript indicates that the signal to which it is applied has undergone a delay; and the Z symbol denoted the circuit output, i.e., the error signal. The + and · symbols between the equation factors denote the logical "OR" and "AND" operations, except where a series of dots is obviously used to represent missing terms in a series of terms, e.g. $X_1, X_2, \ldots X_n$.

When the equations have been evolved, a circuit employing basic logic circuits or component blocks, can be designed to implement the equations. The final circuit here is the minimal circuit which will perform all the necessary functions, i.e. no simpler circuit realization can be designed.

An implementation of the design equations utilizing AND, OR and inverter logic and delay means is shown in FIG. 2.

The circuit comprises an input AND gate 12, an input OR gate 22, a safety OR gate 20, a memory OR gate 16, a memory AND gate 18, a first inverter 24, delay means 26, a delay inverter 28 and an output AND gate 30 from which the circuit output signal, Z, is derived. If resistor-transistor logic (RTL), diode-transistor logic (DTL) or transistor-transistor logic (TTL) is employed, an amplifier may not be required in the feedback loop between the memory AND gate 18 output and the memory OR gate 16 input; if diode logic is employed, an amplifier must be used to provide sufficient gain.

The safety OR gate 20 provides a hazard-free circuit. A hazard is a false output—that is, an output when there should be none or no output when one should exist. It has been found that without the safety OR gate 20, false outputs can occur because of signal delays due to capacitive and other circuit effects. The safety OR gate eliminates hazards and ensures reliable operation.

The set of input signals, $X_1 \ldots X_n$, is applied in parallel to the input AND gate and input OR gate 22. There is a memory circuit 14 (dotted block) comprising the memory OR gate 16 and the memory AND gate 18 in series.

The output of the input AND gate 12 is fed to an input of the memory OR gate 16 and to an input of the safety OR gate 20. The output of the input OR gate 22 is fed to an input of the memory AND gate 18 and to the first inverter 24. The output of the first inverter 24 is fed to an input of the memory OR gate 16 and an input of the output AND gate 30. The output of the memory OR gate 16 is fed to an input of the memory AND gate 18 and to delay means 26 whose output is fed to the output AND gate 30 through delay inverter 28. The output of the safety OR gate 20 is fed to an input of the memory AND gate 18 the output of which is also fed to an input of the safety OR gate 20.

The operation of the circuit will be described in terms of the presence of a signal (a 1 signal) or the absence of a signal (a 0 signal) at the input and output terminals of the various logic components for the intervals shown in FIG. 1.

Figure 3A:
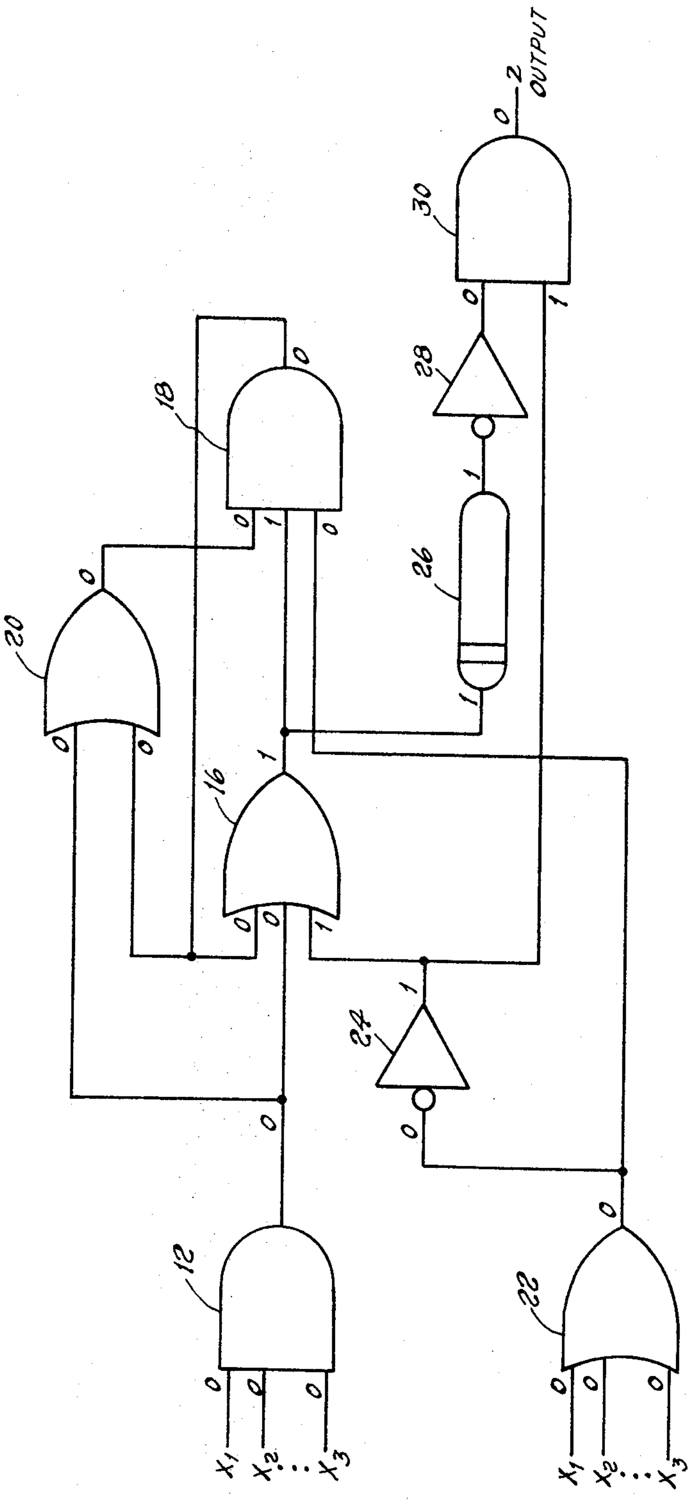

FIG. 3A shows the conditions which exist for an interval A, and interval which can be considered the starting interval where the inputs are all 0 and no input signals have been previously applied. Assume three input signals although any number from two to the fan-in capability of the · logic components may be used. Since the three inputs ($X_1$, $X_2$, and $X_3$) are 0, the outputs of both the input AND gate 12 and the input OR gate 22 are 0. The output of the 1st inverter 24 is 1 which means that the output of the memory OR gate 16 is 1. Since starting conditions were assumed, the output of the delay inverter 28 · was 0 and will remain 0 when the delayed 1 signal comes through the delay means 26 so that the output of the output AND gate 30 remains 0 during the interval A. Since the output of the memory AND gate 18 must also have been 0, a 0 signal is being fed back to the inputs of the memory OR gate 16 and the safety OR gate 20. This means that both input signals to the safety gate OR gate 20 are 0 and its output must be zero to the memory AND gate 18. Even if the starting output of the latter were not assumed, the fact that a 0 input from the input OR gate 22 is fed to it would require a 0 output from the memory AND gate 18. The memory OR gate 16 has 0, 0 and 1 inputs and therefore must have a 1 output.

Figure 3B:
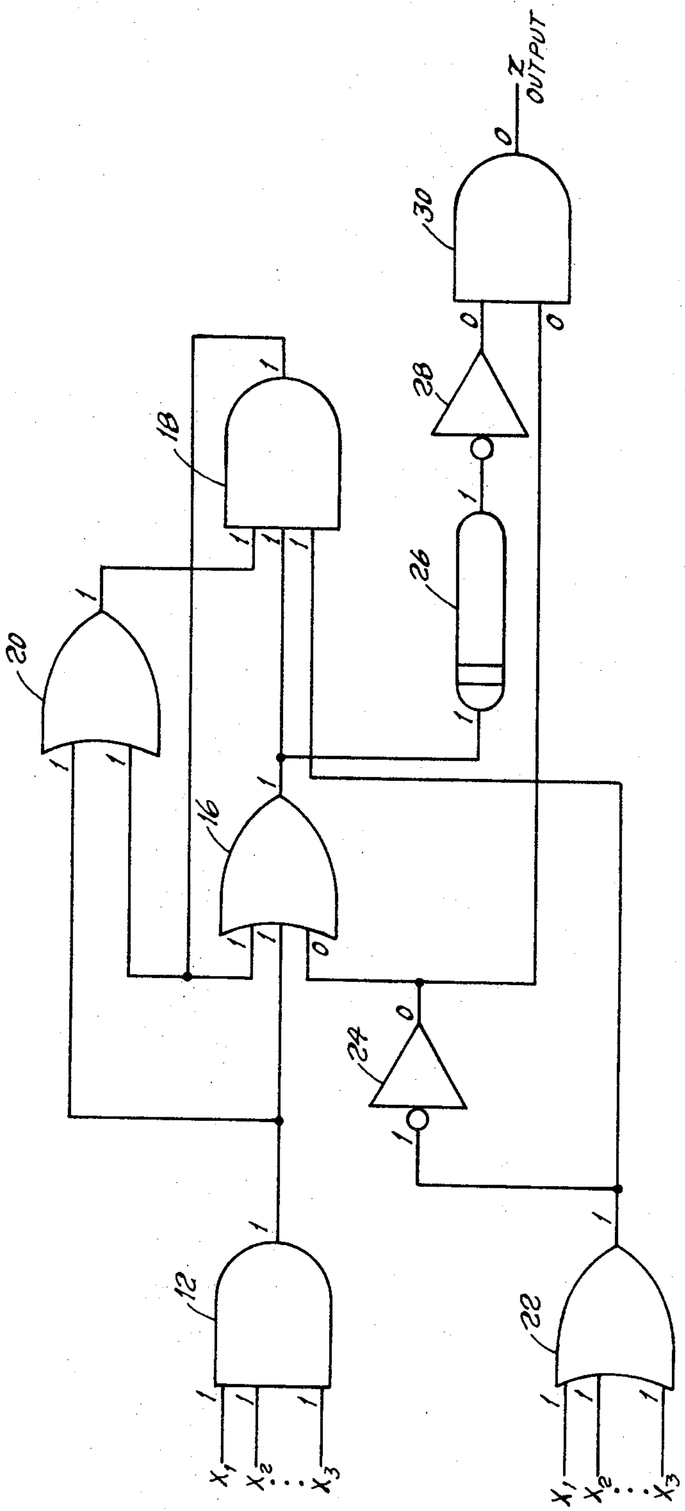

Interval B is the situation in which all inputs are simultaneously present—there is no skew to effect a time displacement between input signals and there are no errors (no noise and no dropouts). In FIG. 3B, the three input signals are now 1 and the output from the input AND gate 12 is a 1. Thus, one input to the memory OR gate 16 is a 1 and its output is a 1. One input to the safety OR gate 20 is also a 1 and its output must be a 1. Since the output of the input OR gate 22 is now changed to a 1, the memory AND gate 18 has three 1 inputs and its output is a 1. This feeds back a 1 signal to the memory OR gate 16 and the safety OR gate 20. The first inverter output is a 0 which places a 0 at one input of the output AND gate 30 forcing its output to remain 0. The delayed input to the output AND gate 30 remains a 0, as before.

At the start of interval C, all input signals go to zero and remain there. The situation returns to what is shown in FIG. 3A. The 0 output from the input OR gate 22 forces the output of the memory AND gate 18 to change to a 0. This signal and the 0 input from the input AND gate 12 change the safety OR gate output to a 0. The 1 input from the first inverter 24 keeps the memory OR gate output at a 1. Although this 1 is applied to the output AND gate 30, the previous delayed input signal to this gate was a 0 and it remains as 0 after the new delayed signal comes through so that the Z output signal remains a 0.

From the start of interval D to the end of interval J, there exists a condition in which skew is present but no errors. Interval D is the time from the start of the first input signal $X_1$ to the start of the delayed signal $Y_{1D}$ at the output of the delay means. The delay time may be any interval between the following limits: (1) if too long, the delayed signal would interfere with the functioning of the circuit on the next set of input signals, and (2) if too short, the output signal, Z, is too narrow to be recorded by subsequent counting circuits. In interval D, X, changes to a 1 and $X_2$ and $X_3$ remain 0. This changes the output of the input OR gate 22 to a 11 and the output of the first inverter 24 to a 0. The output of the memory OR gate 16 becomes 0 because it now has three 0 inputs. This does not alter the 0 output of the memory AND gate 18. The output of the delay means 26, which was a 1 during interval C, remains a 1 because of time its new input signal is delayed.

The output signal of the delay means 26 changes to a 1 during interval E (FIG. 3D) and the delay inverter 28 output to a 1. However, the circuit output, Z, remains a 0 because one of the inputs to the output AND gate 30 is a 0.

Figure 3C:
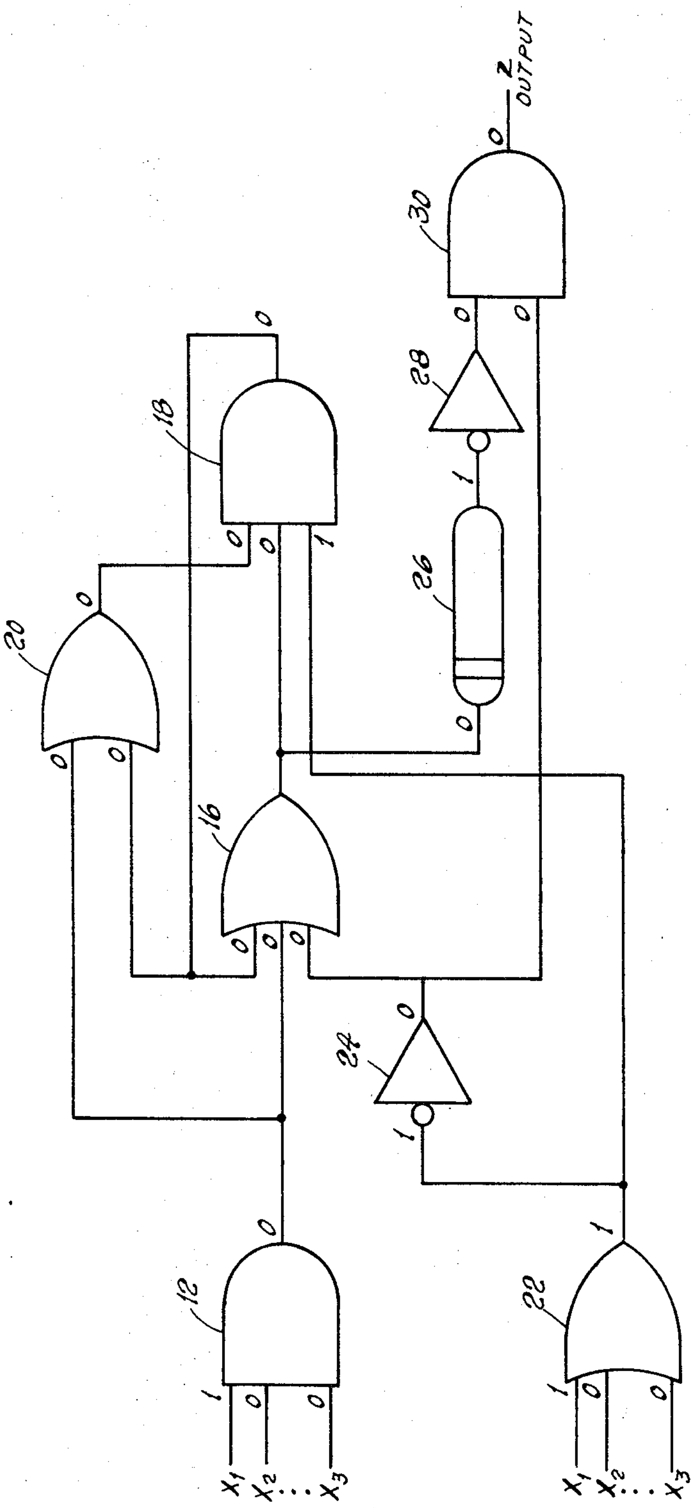
Figure 3D:
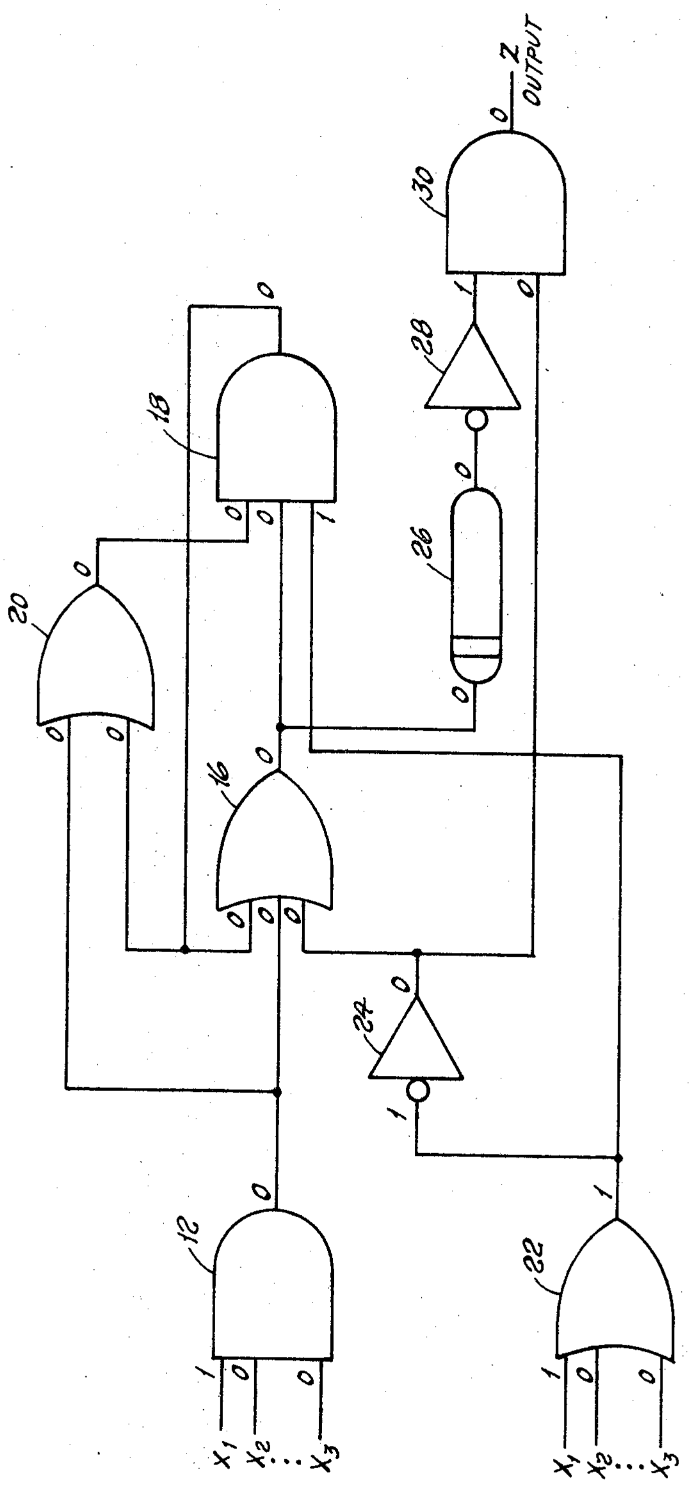

In interval F, input X, is still an $X_1$ and input $X_3$ still a 0, but input $X_2$ changes to a 1. The situation otherwise remains as shown in FIG. 3D.

In interval G (see FIG. 3E), all three inputs are simultaneously 1. The output of the input AND gate 12 changes to a 1 which changes the outputs of the memory OR gate 16 and the safety OR gate 20 to 1's. The output of the memory AND gate 18 now becomes a 1 and the feedback signal, $y_2$ is a 1. This situation is basically the same as that shown in FIG. 3B except that the outputs of the delay means 26 and the delay inverter 28 remain a 0 and a 1, respectively, because of the delay.

At the start of interval H, the output of the delay means 26 changes to a 1 and that of the delay inverter to a 0, the situation being that shown in FIG. 3B.

Figure 3E:
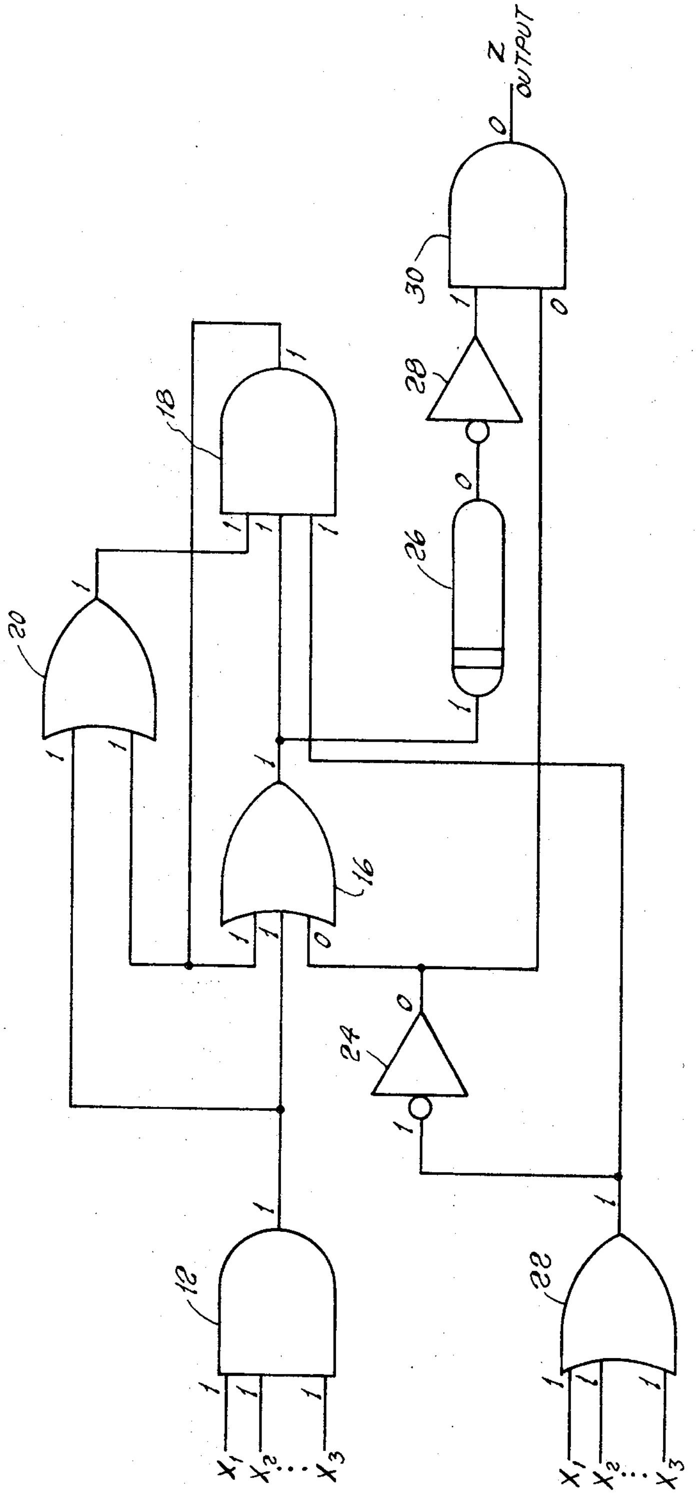

During interval I, $X_1$ falls to 0, $X_2$ and $X_3$ being 1's (see FIG. 3E). This changes the output of the input AND gate 12 to a 0. However, to change the output of the memory AND gate 18 from a 1 to a 0, the output of the input OR gate must change to 0, an event which has not occurred. Therefore, the output of the memory AND gate 18 remains a 1, the feedback signal, $y_2$, remains a 1, and the outputs of the memory OR gate 16 and the safety OR gate 20 remain 1's.

Figure 3F:
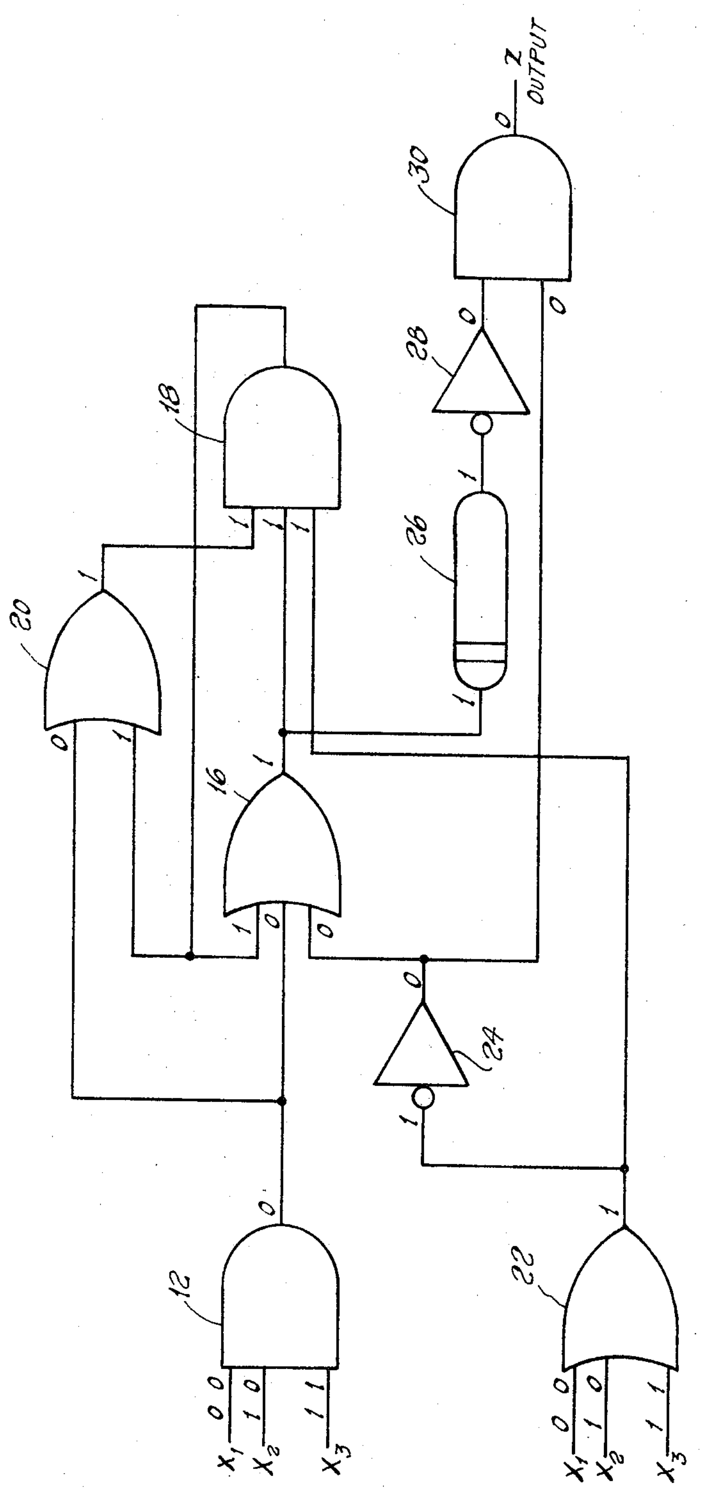
Figure 36:
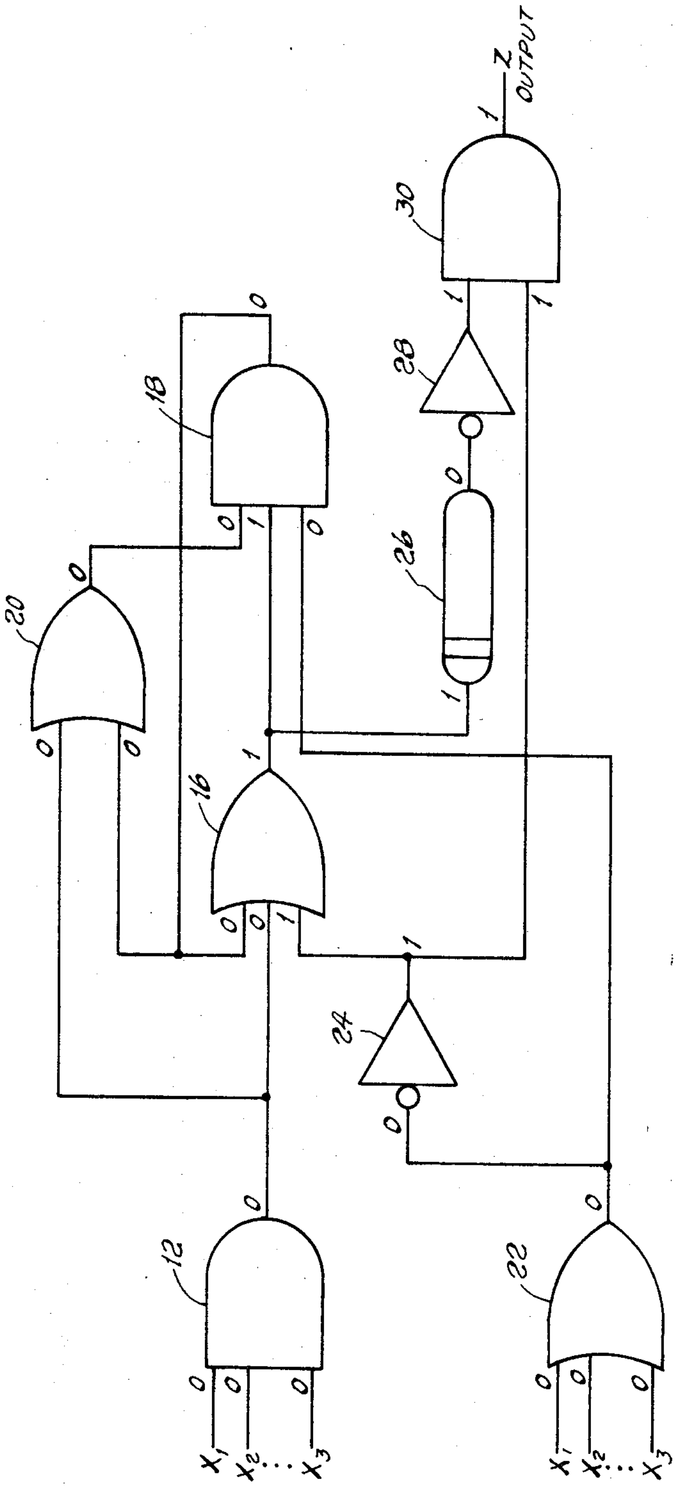

During intervals J, $X_2$ falls to 0, $X_1$ is a 0 and $X_3$ is a 1. None of the circuit conditions changes except the input $X_2$ and the situation therefore remains as shown in FIG. 3F.

During interval K, all the circuit inputs fall to 0 and the situation is as shown in FIG. 3A. The output of the input OR gate 22 becomes 0 which changes the output of the memory AND gate 18 to 0. This feeds back a 0 signal to the memory OR gate 16 and the safety OR gate 20. The output of the former remains a 1 because of the 1 input from the first inverter 24, but the output of the latter changes to a 0. The circuit output, Z, remains as 0 in spite of the fact that some input signals existed while one or more were absent because the circuit "remembered" that all were simultaneously present at some time during the existence of this set of input signals. The mechanism of this remembering is the circulating feedback signal, $y_1$, from the memory AND gate 18 to the memory OR gate 16. A simultaneous occurrence of all input signals makes the $Y_1$ signal (and therefore $y_1$) a 1 and even though one or more of the input signals then disappear, the feedback signal remains a 1 which places a 0 at one input to the output AND gate 30 and inhibits the Z output. The only way the circulating feedback signal can become a 0 after the simultaneous occurrence of three input signals is for all input signals to disappear and then for one or more, but not all input signals to reappear.

In the set of input signals which exist during the intervals L through N, there is an error (dropout of signal $X_1$) and skew (between signals $X_2$ and $X_3$). During interval L, only $X_2$ is a 1. This is basically the same situation that is shown in FIG. 3C for interval D. The output of the input OR gate 22 changes to a 1 which changes the output of the first inverter 24 to a 0 and thus feeds a third 0 input to the memory gate 16, changing the output of the latter to a 0. This changes the delayed input to the output AND gate 30 to a 0 but does not affect the output signal, Z, which was a 0 before. At a time, $D_E$, after the start of interval L, the delayed signal, $y_{1D}$, goes to 0 and the inverted delayed signal, $\overline{y_{1D}}$, goes to 1 without changing the 0 value of the circuit output signal. This is similar to the situation shown in FIG. 3D.

During interval N, the $X_2$ signal drops to 0 and only the $X_3$ signal is present. No other change occurs and the situation remains as shown in FIG. 3D.

At the start of interval P, $X_3$ goes to 0 (i.e., all input signals disappear after an interval in which there have been one or more, but not all, input signals simultaneously in existence). The output of the input OR gate 22 goes to 0, the output of the first inverter 24 goes to 1 and the output of the memory OR gate 16 goes to 1. This 1 signal does not yet appear at the output of the delay means 26 so that the delay signal input, $\overline{y_{1D}}$, to the output AND gate 30 is still a 1. In addition, the other input to this gate 30 is also a 1 because the output of the input OR gate 22 has become a 0 and that of the first inverter 16 a 1. This is shown in FIG. 3G.

After the delay period, $D_{E1}$, the output of the delay means 26 becomes 1 which places a 0 input at the output AND gate 30 and drops the output signal, $Z_1$ to 0. This is the situation for interval Q, shown in FIG. 3A.

During intervals R and S, an error exists (dropout of signal $X_3$) but no skew. The only difference between the situations during these periods is due to the delaying of signal $Y_1$. Thus, signal $y_{1D}$ exists during interval R but not during S. Conversely, $\overline{y_{1D}}$ is 0 during R but 1 during S. These situations are shown in FIGS. 3C and 3D, respectively, except for the circuit input signals.

During interval T, all circuit inputs drop to 0 and this occurs after there has been an error (i.e. dropout on one take track). As shown in FIG. 3G the output of the first inverter 24 becomes a 1 since the output of the input OR gate 22 goes to 0. This places a 1 on one of the inputs to the output AND gate 30 and makes the output of the memory OR gate 16 a 1. However, due to the delay, the output of the delay means 26 is still a 0 and that of the delay inverter 28 a 1, so that the output AND gate 30 has two 1 inputs and therefore the circuit output is a 1. This situation persists until the $Y_1$ signal, which is a 1, comes through the delay means 26 at the end of the delay period, $D_E$. When this occurs, the delay signal input, $\overline{y_{1D}}$, at the output AND gate 30 becomes 0 and the output Z signal disappears. This is the situation shown in FIG. 3A for interval U.

During intervals V and W, an error, which is a noise signal, exists on track 1, the other tracks having no signal. The noise signal is represented by a pulse. The situation in interval V is shown in FIG. 3C and the situation in interval W is shown in FIG. 3D.

At the end of the noise signal, the circuit operates to generate an output pulse, Z. This is the situation shown in FIG. 3G for interval X.

During final interval Y, all inputs are 0 and the inputs and outputs at all circuit points are as shown in FIG. 3A.

Thus, it has been demonstrated that the present circuit operates to produce an output when an error signal (noise or dropout) occurs but not when all of a set of input signals have simultaneously occurred even though there may have been a time displacement (skew) between the input signals.

Equivalents of the error-measuring circuit shown in FIG. 2 which utilize other logic circuit blocks, such as NAND circuits or NOR circuits, can be obtained. For example, the circuit shown in FIG. 4 is the equivalent of an AND gate, but is constructed of NAND circuits only and the circuit in FIG. 5 is the equivalent of an OR gate but is constructed of NAND circuits only. The same can be done using only NOR circuits. Thus, if only NAND circuits are available, they can be substituted in equivalent form as shown in FIGS. 4 and 5, for the AND and OR gates of FIG. 2. After simplifying the resulting circuit, a NAND circuit equivalent is obtained as shown in FIG. 6. Comparing the circuits shown in FIGS. 2 and 6, there are certain similarities and certain differences. Both circuits have an input OR gate 22, and output AND gate 30, delay means 26, a delay inverter 28, a first inverter 24 and a memory circuit 14. However, the interior of the memory circuit of FIG. 6 does not consist of an OR gate feeding an AND gate. Also, there is an input NAND gate 32 instead of an input AND gate 12 and a safety NAND gate 34 instead of a safety OR gate 20. The Z output of the circuits is the same for the same input conditions.

Similarly, the embodiment shown in FIG. 7 utilizing only NOR circuits is the equivalent of the embodiment shown in FIG. 2.

An equivalent utilizing NAND and NOR circuits, or other logical component combinations, could be constructed but would not be as simple as the embodiments that have been illustrated.

It will be understood that various changes in the details, materials and arrangement of parts (and steps), which have been herein described and illustrated in order to explain the nature of the invention, may be made by those skilled in the art within the principle and scope of the invention as expressed in the appended claims.

I claim:

1. A minimal logic circuit comprising components for implementing the following design equations, $$Y_1=y_2+(X_1X_2\ \ldots\ X_n)+(\overline{X_1+X_2\ \ldots\ +X_n})$$
$$Y_2=y_1\cdot(X_1+X_2+\ldots+X_n)\cdot(y_2+X_1X_2\ldots X_n)$$
$$Z=\overline{y}_{1D}\cdot(\overline{X_1+X_2+\ \ldots\ +X_n})$$

said logic circuit including a memory circuit and the design equation symbols being defined as follows:

$X_1, X_2 \ldots X_n$ are a set of input signals,
$Y_1$ is an intermediate output in said memory circuit,
$Y_2$ is the final output of said memory circuit,
$y_1$ and $y_2$ are the designations applied to the $Y_1$ and $Y_2$ signals, respectively, when they are applied as inputs to any component of the logic circuit,
Z is the output signal of the logic circuit, and
$Y_{1D}$ is the designation applied to a delayed $Y_1$ signal.

2. A logic circuit as in claim 1, wherein the components comprise logic AND and OR gates, logic inverter means and delay means.

3. A logic circuit as in claim 1, wherein the components comprise only logic NAND gates and delay means.

4. A logic circuit as in claim 1, wherein the components comprise only logic NOR gates and delay means.

5. A logic circuit as in claim 2, comprising an input AND gate receiving as input signals said $X_1 \ldots X_n$ set;
an input OR gate receiving as input signals said $X_1 \ldots X_n$ set;
first inverter means receiving as an input signal the output of said input OR gate;
memory means receiving as input signals the outputs of said input AND and OR gates and said first inverter means, the output signal of said memory means being said $Y_2$ signal which is fed back to an input of said memory means;
a safety OR gate receiving as input signals the outputs of said input AND gate and said memory means, the output of said safety OR gate being fed to said memory means as another input signal;
delay means receiving as an input signal said $Y_1$ signal from said memory means;
a delay inverter means receiving as an input signal the output of said delay means; and
an output AND gate receiving as input signals the outputs of said first inverter means and said delay inverter means and providing said Z signal as an output signal.

6. A logic circuit as in claim 2, comprising an input AND gate receiving as input signals said $X_1 \ldots X_n$ set;
an input OR gate receiving as input signals said $X_1 \ldots X_n$ set;
first inverter means receiving as an input signal the output of said input OR gate;
memory means comprising a memory OR gate and a memory AND gate, said memory OR gate receiving as input signals the outputs of said input AND gate, said first inverter means and said memory AND gate, and said memory AND gate receiving as input signals the outputs of said memory OR gate and said input OR gate, the output of said memory means being said $Y_2$ signal which is fed back as an input to said memory means;
a safety OR gate receiving as input signals the outputs of said input AND gate and said memory AND gate, the output signal of said safety OR gate being fed to said memory AND gate as another input signal;
delay means receiving as an input signal the output of said memory OR gate;
a delay inverter means receiving as an input signal the output of said delay means; and
an output AND gate receiving as input signals the outputs of said first inverter means and said delay inverter means and providing said Z signal as an output signal

7. A logic circuit as in claim 3, comprising:
An input NAND gate receiving as input signals said $X_1 \ldots X_n$ set;
an input OR gate having only NAND gate components receiving as input signals said $X_1 \ldots X_n$ set;
memory means comprising a first and a second NAND gate, said first memory NAND gate receiving as input signals the outputs of said input NAND gate, said input OR gate and said second memory NAND gate, and said second memory NAND gate receiving as input signals the outputs of said first memory NAND gate and said input OR gate;
a safety NAND gate receiving as input signals the outputs of said input NAND gate and said second memory NAND gate, the output of said safety NAND gate being fed as an additional input signal to said second memory NAND gate;
delay means receiving as an input signal the output of said first memory NAND gate;
a delay inverter receiving as an input signal the output of said delay means;
a first inverter receiving as an input signal the output of said input OR gate; and
An output AND gate having only NAND components and receiving as input signals the outputs of said first inverter and said delay inverter and providing said Z signal as its output signal.

8. A logic circuit as in claim 4, comprising:
an input AND gate having only NOR components and receiving as input signals said $X_1 \ldots X_n$ set;
an input NOR gate receiving as input signals said $X_1 \ldots X_n$ set;
memory means comprising a first and a second NOR gate, said first memory NOR gate receiving as input signals the outputs of said input AND gate, said input NOR gate and said second memory NOR gate, and said second memory NOR gate receiving as input signals the outputs of said first memory NOR gate and said input NOR gate;

a safety NOR gate receiving as input signals the outputs of said input AND gate and said second memory NOR gate and providing its output to said second memory NOR gate as an additional input signal;

a first inverter receiving as an input signal the output of said input NOR gate;

delay means receiving as an input signal the output of said first memory NOR gate;

a delay inverter receiving as an input signal the output of said delay means; and an output NOR gate receiving as input signals the outputs of said two inverters and providing said Z signal as its output signal.

References Cited

UNITED STATES PATENTS 3,193,812 7/1965 Friend -------- 340—146.1 XR

JOHN S. HEYMAN, Primary Examiner

J. ZAZWORSKY, Assistant Examiner

U.S. Cl. X.R.

235—153; 307—215, 218; 328—163; 340—146.1